United States Patent Office 2,725,239
Patented Nov. 29, 1955

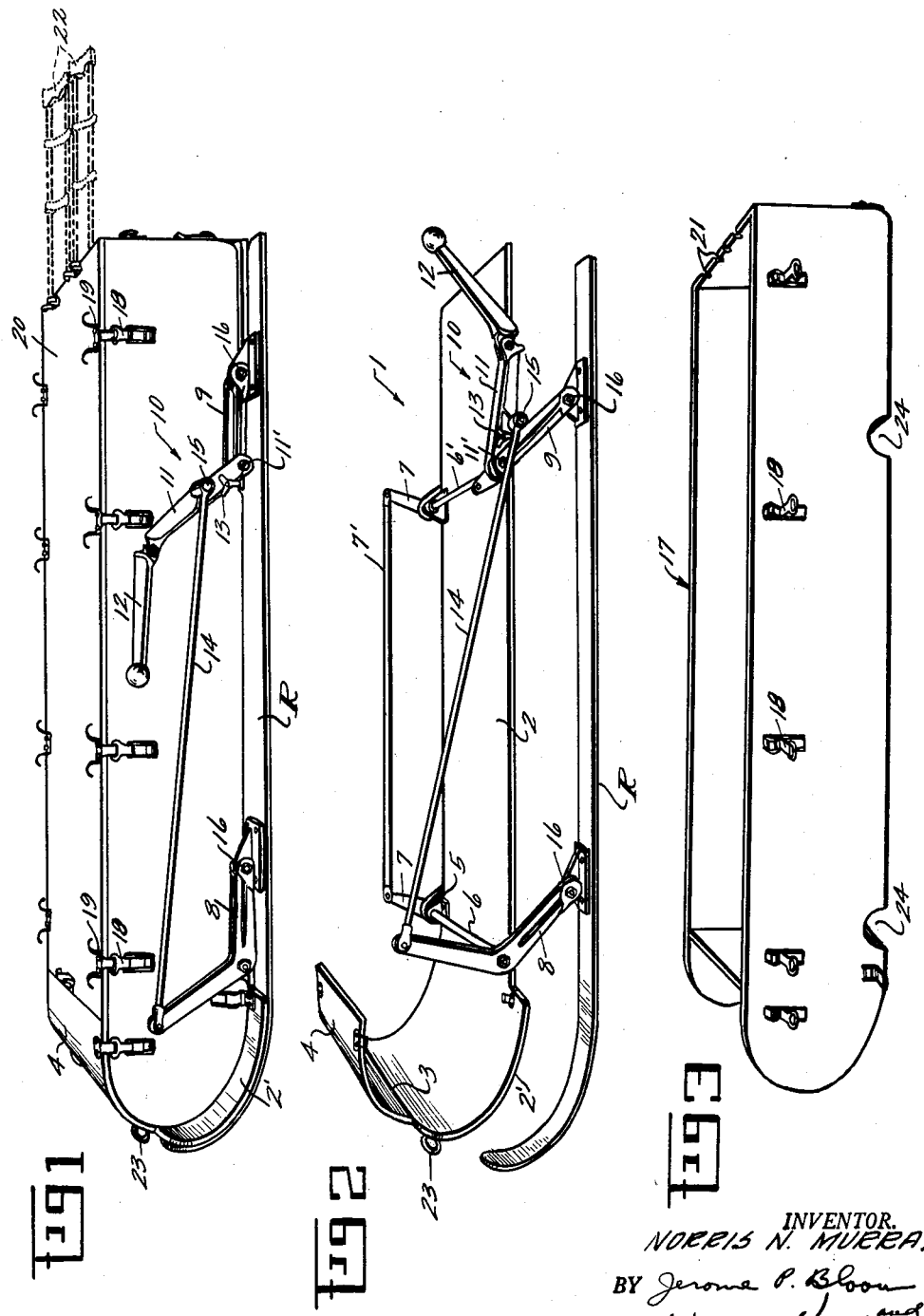

2,725,239

MOBILE CONTAINER UNIT

Norris N. Murray, Dayton, Ohio

Application October 15, 1952, Serial No. 314,976

6 Claims. (Cl. 280—18)

(Granted under Title 35, U. S. Code (1952), sec. 266)

The invention described herein may be manufactured and used by or for the Government for governmental purposes without payment to me of any royalty thereon.

This invention relates to a new and novel mobile container unit particularly adaptable for use in delivery of supplies to inaccessible areas and for ready movement of bulky and unwieldy materials with a minimum of effort. In many instances delivery of supplies to inaccessible areas is necessarily made by aircraft and on many occasions where the aircraft cannot land or where it is not feasible for it to land the supplies have to be dropped by parachute. Then the container which carries supplies must be reached wherever it may land and ordinarily since the container is too unwieldy it must be opened and the supplies carried away piecemeal. This may be a long drawn out and difficult procedure. The new and novel mobile container unit which is the subject of this invention eliminates such difficulties since it is adaptable for ready movement over water, snow, ice, sand or mud as well as most types of terrain enabling the unit as a whole to be easily moved to a desired location. Not only does the device supply a mobile container unit but upon disposal of the supplies within the receptacle portion such receptacle may be disengaged from the remainder of the unit leaving a mobile vehicle unit which is adaptable for use as a toboggan or sled selectively and capable of use for additional transport of persons as well as other objects which could not be accommodated by the receptacle. Moreover the use of cellular glass in fabricating the container results in a floatable container.

An object of this invention is to provide a new and novel mobile container unit which greatly facilitates the handling of unwieldy heavy materials.

Another object of the invention is to provide a novel mobile container unit having a toboggan shaped bottom and having runners connected therewith which are vertically adjustable with respect to said toboggan shaped bottom whereby the container unit may be moved over various difficult types of terrain.

A further object of the invention is to provide a new and novel mobile container unit which is readily adaptable for the carriage and movement of persons as well as materials and supplies.

An additional object of the invention is to provide a new and novel convertible toboggan-sled carrying device.

Other objects and advantages of the invention will be readily apparent from the following description taken in conjunction with the accompanying drawings wherein:

Fig. 1 shows in perspective the new and novel mobile container in normal condition wherein the runner members are retracted to provide a toboggan shaped bottom surface.

Fig. 2 shows in perspective the bottom panel of the mobile container in detail with the runners in extended position.

Fig. 3 shows in perspective the receptacle details.

The mobile container unit which is the subject of this invention is made of cellular glass fabric sealed watertight and consists of a toboggan shaped bottom panel member 1 having a rectangular portion 2 merging into an upwardly curved forward portion 2' of increased width. Hingedly connected to the upper extremity of the curved portion 2' by any suitable hinge means 3 is a closure member 4. Transversely aligned spaced bearings members 5 are fixed to the upper surface of the portion 2 providing bearing means for the rotatable shafts 6 and 6' respectively which are arranged in parallel relation. Bell crank members 7 are attached to the respective shafts 6 and 6' to one side of the panel portion 2. A link 7' connects the bell crank members 7 at their upper extremities for conjoint movement. A bell crank member 8 having an elongated arm member extending upwardly is transversely disposed relative to the forward member 7 and connected to the shaft 6 at the opposite end thereof. A link member 9 longitudinally aligned with the member 8 and transversely aligned with respect to the rear bell crank lever 7 is fixed to the shaft 6'. A control member 10 including a link arm 11 and an operating arm 12 which is pivotally joined to the link arm is connected to link member 9. A coil spring member encircling the pivot normally tends to bias the operating arm forward and downwardly with respect to the link arm. A spring biased lock member 13 is screwed into a threaded opening in the link arm 11 adjacent the pivot 11', the lock member being adapted to be screwed into the link member 11 in unlocked position and extended in the lock position. A link member 14 pivotally connects the upper extremity of the elongated arm on the bell crank member 8 with the link arm 11 at a point 15 adjacent the lock member 13. Pivotally connected at 16 to the lower extremities of the respective pairs of longitudinally aligned bell crank members are runner members R arranged so as to be longitudinally parallel. Accordingly the runner members are vertically adjustable with respect to the toboggan shaped bottom panel. A partitioned receptacle 17 having latch means 18 spaced about its perimeter is secured to the member 1 by cooperating latch elements 19 fixed to the member 1. The bottom of the member 17 has longitudinally spaced transverse recesses 24 therein to receive the shaft members 6 and 6' in nesting relation therewith. A top panel member 20 having similar latch members 19 spaced thereabout is secured to the top of the receptacle to form a closure for the rear partitioned portion of member 17 whereas the member 4 which is hingedly connected to the member 1 at its upper curved forward portion forms a closure for the upper forward portion of the member 17 and is secured to the side panels thereof by suitable latching means. Notches 21 are formed in the upper rear panel of the member 17. These notches 21 are adapted to receive in sliding engagement therewith the U shaped members 22 as shown in the drawings. The members 22 are adapted to be slidingly inserted with their open ends forward extending within the receptacle to convert the upper portion of the container for use as a stretcher to facilitate movement of an injured person. To the forward side of the upwardly curved forward portion of the bottom member 1 are secured loop members 23 by any suitable means. These loop members are adapted to receive ropes, cables or any similar draw members whereby due to the shape of the mobile container the container unit may be selectively pushed or drawn over the terrain. It is noted that the material of which the container is made renders it floatable adapting it for use on water.

The structure as set forth, as may readily be seen, comprises the toboggan shaped element, the receptacle element, the toboggan shaped element including a means or panel member attached to the forward end thereof which forms a closure means for the open top of the receptacle and a panel member to complete the closure of the receptacle whereby the new and novel mobile container unit obtains. The runner members are adjustably related to the unit as follows: For conversion of the toboggan bottom panel to a sled, the operating arm 12 is drawn rearwardly against the spring bias in the pivot means until it engages and abuts against the link arm 11 and then further depression thereof will cause the rotation of the members 7, 8 and 9 to bring the runner members into extended position against the ground thus raising the container including the toboggan panel above the surface thereof. Upon complete depression of the operating arm 12 to convert the toboggan element into a sled element the lock member 13 is manually extended to provide an abutment under which the link 14 abuts preventing the forward movement of the operating arm and the collapse of the unit. To convert the container back to the toboggan shaped bottom the lock member is merely screwed into the link 11 and the operating arm brought forward resulting in the lowering of the whole unit to the surface of the ground. As can be readily seen, the receptacle unit is so fashioned that upon completion of its function it may be removed by disengaging the latch member securing it to the bottom panel member 1 and by disengaging the hinge member 4 from the top thereof, and a mobile carrying unit consisting of a convertible toboggan-sled remains. And this toboggan-sled arrangement has further an additional utility within itself for transport of persons and materials which are not easily adapted to fit within the receptacle.

Moreover the entire unit, upon extension of the U-shaped members 22, is adapted to serve not only as a carrier of supplies which has great mobility but is also adapted to receive an injured person on the top thereof. The U-shaped members provide support for the legs of the person.

As can be readily seen the invention presents a clear advance in the container art by its very convertibility, mobility and utility, as well as providing an improved mobile carrier unit which is adapted as well as the container combination for use under all types of extreme and difficult conditions of supply.

While a preferred embodiment of the invention has been shown and described herein, nothing should be so construed to limit the invention thereto since various modifications and applications thereof should be readily apparent to one skilled in the art and such lies within the scope of the appended claims.

I claim:

1. A mobile container comprising receptacle means open at least at the top forward portion, a toboggan shaped panel releasably secured to the bottom thereof having an upwardly curved forward portion conforming to the end shape of the receptacle, and curved panel means hinged to the extremity of said upwardly curved forward portion providing an extension of said curved portion forming a closure means for the top forward portion of said receptacle whereby a container readily movable over any surface obtains.

2. The structure as set forth in claim 1 including runner means, normally in contiguous relation to said toboggan shaped panel and adjustable means interconnecting said panel and said runner means, whereby the runners may be vertically adjusted to increase the mobility of the container.

3. A mobile container comprising a receptacle open at least at the top forward portion thereof and having recessed portions in the bottom thereof, a toboggan shaped panel having bearing means mounted on the upper side thereof, shaft means rotatably mounted in said bearing means, the panel being secured to the bottom of said receptacle whereby the bearing and shaft means are nested in the recessed portions of the receptacle, means hinged to the upwardly curved portion of the panel providing a closure means for the top forward portion of the receptacle, and runners connected to the shaft means and arranged so as to be vertically adjustable with respect to the panel.

4. A mobile container comprising a receptacle open at the top and having the side panels thereof extending longitudinally therefrom at one end thereof, the forward portions of the extensions having an outline of substantially arcuate nature, a toboggan shaped panel secured to the bottom of said receptacle, its upwardly curved forward portion conforming to the curve of said extensions defining an additional compartment, a panel hinged to said forward portion at the extremity thereof forming a closure means for the additional compartment of said receptacle whereby a container readily movable over any surface obtains.

5. The structure as set forth in claim 4 including runner means normally in contiguous relation to said toboggan shaped panel, and means interconnecting said toboggan shaped panel and said runner means whereby the runner means may be simultaneously and symmetrically vertically adjusted to vary the mobility of the container.

6. A mobile container comprising a receptacle open at least at the top forward portion and the forward end thereof, a toboggan shaped panel of greater width than said receptacle at the forward end thereof providing extended side portions and curved upwardly conforming in shape to said forward end of the receptacle, means hingedly connected to the upwardly curved portion of said panel forming a closure for the open forward portion of the receptacle, runner means, means connecting said runner means to said toboggan shaped panel for vertical adjustment relative thereto to vary the mobility of said container, the runner means in retracted position being in nested position relative to said extending side portions.

References Cited in the file of this patent

UNITED STATES PATENTS

| 367,280 | Emerson | July 26, 1887 |
| 964,809 | Quackenbush | July 19, 1910 |
| 1,438,359 | Caron et al. | Dec. 12, 1922 |
| 1,460,944 | Cameron | July 3, 1923 |
| 1,822,384 | Spinner et al. | Sept. 8, 1931 |
| 2,395,174 | Drueke | Feb. 19, 1946 |
| 2,594,781 | Magnussen | Apr. 29, 1952 |

FOREIGN PATENTS

| 182,962 | Canada | Mar. 19, 1918 |